(12) United States Patent
Sjöqvist

(10) Patent No.: US 7,802,962 B2
(45) Date of Patent: Sep. 28, 2010

(54) BEARING SUPPORT STRUCTURE AND A GAS TURBINE ENGINE COMPRISING THE BEARING SUPPORT STRUCTURE

(75) Inventor: Roger Sjöqvist, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 826 days.

(21) Appl. No.: 11/576,699

(22) PCT Filed: Sep. 13, 2005

(86) PCT No.: PCT/SE2005/001331

§ 371 (c)(1),
(2), (4) Date: Apr. 5, 2007

(87) PCT Pub. No.: WO2006/038842

PCT Pub. Date: Apr. 13, 2006

(65) Prior Publication Data

US 2008/0031727 A1 Feb. 7, 2008

(30) Foreign Application Priority Data

Oct. 6, 2004 (SE) .................................. 0402441

(51) Int. Cl.
*F01D 25/16* (2006.01)

(52) U.S. Cl. ...................... 415/142; 415/229

(58) Field of Classification Search ............... 415/142, 415/229; 60/796
See application file for complete search history.

(56) References Cited

U.S. PATENT DOCUMENTS

| | | | |
|---|---|---|---|
| 3,620,641 A * | 11/1971 | Keen et al. ................. | 415/142 |
| 4,428,713 A | 1/1984 | Coplin et al. | |
| 5,941,683 A * | 8/1999 | Ridyard et al. ............ | 415/142 |
| 6,494,032 B2 | 12/2002 | Udall et al. | |
| 6,708,482 B2 | 3/2004 | Seda | |
| 2001/0020361 A1 * | 9/2001 | Udall et al. ............... | 60/226.1 |

OTHER PUBLICATIONS

International Search Report for corresponding International Application PCT/SE2005/001331.

* cited by examiner

*Primary Examiner*—Richard Edgar
(74) *Attorney, Agent, or Firm*—WRB-IP LLP

(57) ABSTRACT

A bearing support structure is provided for installation in a gas turbine engine between radially inner first and second bearings adapted to rotatably support a first and a second rotor, respectively, and a radially outer engine frame. The support structure includes a first annular plate-shaped part and an arrangement for supporting the first bearing at one end thereof and a second annular plate-shaped part and an arrangement for supporting the second bearing at one end thereof. The first and second plate-shaped parts are joined together forming a one-piece unit for installation in the gas turbine engine.

20 Claims, 3 Drawing Sheets

BEARING SUPPORT STRUCTURE AND A GAS TURBINE ENGINE COMPRISING THE BEARING SUPPORT STRUCTURE

BACKGROUND AND SUMMARY

The present invention relates to a bearing support structure for installation in a gas turbine engine between radially inner first and second bearings adapted to rotatably support a first and a second rotor, respectively, and a radially outer engine frame, the support structure comprising a first annular plate-shaped part and means for supporting the first bearing at one end thereof and a second annular plate-shaped part and means for supporting the second bearing at one end thereof. The invention also relates to a gas turbine engine comprising the bearing support structure.

The bearing support structure may be used in stationary gas turbine engines, but is especially advantageous for aircraft jet engines. Jet engine is meant to include various types of engines, which admit air at relatively low velocity, heat it by combustion and shoot it out at a much higher velocity. Accommodated within the term jet engine are, for example, turbojet engines and turbo-fan engines. The invention will below be described for a turbo-fan engine, but may of course also be used for other engine types.

An aircraft gas turbine engine of the turbofan type generally comprises a forward fan and booster compressor, a middle core engine, and an aft low pressure power turbine. The core engine comprises a high pressure compressor, a combustor and a high pressure turbine in a serial relationship. The high pressure compressor and high pressure turbine of the core engine are interconnected by a high pressure shaft. The high-pressure compressor, turbine and shaft essentially form a high pressure rotor. The high-pressure compressor is rotatably driven to compress air entering the core engine to a relatively high pressure. This high pressure air is then mixed with fuel in the combustor and ignited to form a high energy gas stream. The gas stream flows aft and passes through the high-pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Most of the thrust produced is generated by the fan. Engine frames are used to support and carry the bearings, which in turn, rotatably support the rotors. Conventional turbo fan engines have a fan frame, a mid-frame and an aft turbine frame.

The engine is mounted to the aircraft at a forwardly located fan frame forward mount on the fan frame and at a rearwardly located turbine frame aft mount on the turbine frame.

The invention especially relates to the aft portion of the engine, and more particularly where an aft portion of the engine frame is located between the high pressure turbine and the low pressure turbine and extends radially inwardly from the position of a turbine frame aft mount. There are known solutions of bearing support structures arranged radially between and connected to inner first and second bearings which rotatably support a first and a second rotor, respectively, and the radially outer aft portion of the engine frame. According to one such solution, the bearing support structure comprises a casted bearing house supporting both bearings and which is fixedly joined to a so-called torsion box, either by welding or bolts. The torsion box in turn is fixedly joined to the engine frame. Such a casted bearing house often has a complex shape and is casted in one-piece. The process for producing such a bearing house and to mount it in the engine is time-consuming.

A further example of a prior art aircraft engine is described in U.S. Pat. No. 6,708,482. An aft portion of the engine frame is located between the high pressure turbine and the low pressure turbine and extends radially inwardly from the position of a turbine frame aft mount. A bearing support structure supports the first and second bearing which rotatably support the first and second rotor, respectively. The bearing support structure comprises two separate plate-shaped parts, each extending from one of the first and second bearing to the engine frame. The two separate plate-shaped parts are bolted to the engine frame from opposite sides of it in the direction of the engine longitudinal central axis. The position of the bearings and the construction of the bearing support structure makes installation of the structure in the engine and removal of it from the engine cumbersome. Further, there is a trend to move the rearwardly located turbine frame aft mount forward so that the complete, or at least parts of the, low pressure turbine receives an overhang. One reason for this development is to cut weight. The traditional aircraft engine Turbine Rear Frame (TRF), also called Tail Bearing House (TBH) or Turbine Exhaust Case (TEC), will then be replaced by or complemented with a bearing support structure forwardly of the complete, or at least parts of the, low pressure turbine. This bearing support structure, so-called Turbine Center Frame (TCF) or Turbine Mid-Frame (TMF), will transfer bearing loads from at least two different shafts. Large stiffness requirements are placed on the bearing support structure and the associated aft engine frame due to dynamic interaction between these shafts, which may rotate in the same direction or be counter-rotating.

It is desirable to achieve a bearing support structure for a gas turbine engine with two rotors, which structure should be easily installed and have a sufficient stiffness for transferring bearing loads and be positioned radially between bearings for the two rotors and an engine frame. The bearing support structure should preferably be of light weight. The bearing support structure should further be especially suitable for a gas turbine engine with its rearwardly located turbine frame aft mount positioned forward so that the complete, or at least parts of the, low pressure turbine receives an overhang.

By using two plate-shaped parts for supporting the two bearings, the complex prior art casted bearing house is no longer required. Further, this solution creates conditions for eliminating the prior art torsion box. Thus, the one-piece bearing support structure replaces the casted bearing house and the torsion box. Further, the invention creates conditions for using stronger materials in the bearing support structure and it can also be made lighter relative to conventional castings.

One requirement on gas turbine engines is that they should withstand large rotational inbalances which may occur when a fan or turbine blade, or parts thereof, comes loose for some reason. The inventive solution has great potential in that the effects of an inbalance on one of the bearings may be transferred to the other bearing through the two plate-shaped parts. This results in smaller reactional forces in engine mounts, which creates conditions for making a lighter engine frame.

Each of the bearing support means of the plate-shaped parts comprises a bearing holder or race integrated in or joined to the respective plate-shaped part. The bearings are mounted in the respective bearing holder or race in the support portions.

According to a preferred embodiment of the invention the bearing support structure comprises an annular central member and that the first and second plate-shaped parts are fixedly joined to the annular central member. This creates conditions for a sufficiently stiff structure for transferring loads between the bearings and the engine frame. The first and second plate-shaped parts are preferably conical and diverge from the central annular member to the respective bearing.

According to a further development of the last-mentioned embodiment, the structure comprises a third annular plate-shaped part with means for connection to the engine frame. Also the third plate-shaped part is preferably fixedly joined to the annular central member.

Such a construction further improves the stiffness of the structure.

The bearing support structure preferably also comprises a fourth annular plate-shaped part with means for connection to the engine frame. By joining a first end of each of the four conical plate-shaped parts to the central member and arranging the parts to extend in different directions forming the shape of an X in cross section transverse to the engine longitudinal central axis, radial stiffness between the bearings and the engine frame is achieved. Further, a flexibility for relative motion between the two bearings is achieved. Further, a torsional moment on the engine frame is minimized, which creates conditions for making this component lighter and less complex.

Further, the inclination and thickness of each conical plate-shaped part may be varied so that a flexible system for transferring bearing loads is achieved.

One problem with prior known solutions is that the positions of the two bearings are set from rotordynamical requirements. One of the bearings (or both bearings) may then end up in a position far from the most favourable position with regard to loads and torsional moments; vertically below the engine mount. One advantage with the inventive solution is that the design of the bearing support structure may be amended easily by replacing one of the conical plate-shaped parts with another part having a different inclination and/or length and/or material.

It is also desirable to achieve a gas turbine engine with a bearing support structure "between radially inner first and second bearings adapted to rotatably support a first and a second rotor, respectively, and a radially outer engine frame, which structure has a sufficient stiffness for transferring bearing loads and is easy to install and remove from the engine. The bearing support structure is preferably arranged between the high pressure turbine and the low pressure turbine in the direction of the engine longitudinal central axis.

Further advantageous embodiments and further advantages of the invention emerge from the detailed description below.

BRIEF DESCRIPTION OF THE DRAWINGS

The invention will be explained below, with reference to the embodiments shown on the appended drawings, wherein.

DETAILED DESCRIPTION

Figure 1:
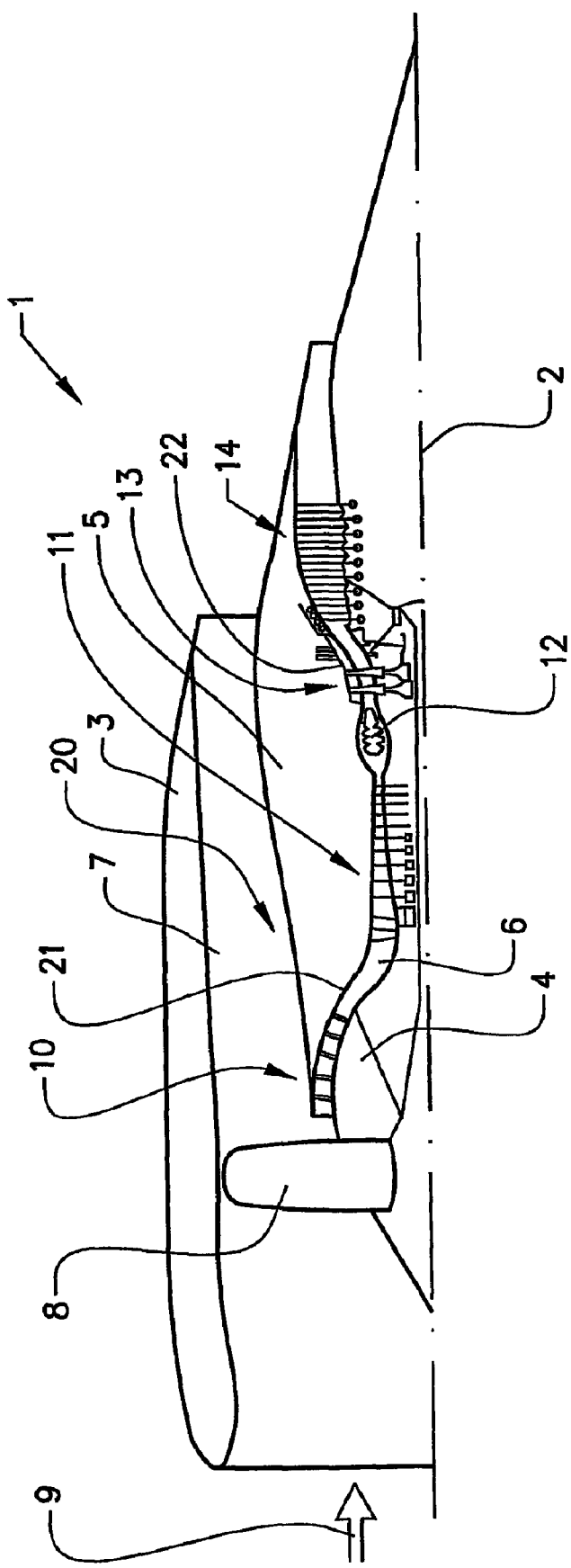
FIG. 1 is a schematic longitudinal sectional view illustration of an exemplary embodiment of an aircraft turbofan gas turbine engine.

The invention will below be described for a turbofan gas turbine aircraft engine 1, which in FIG. 1 is circumscribed about an engine longitudinal central axis 2. The engine 1 comprises an outer casing or nacelle 3, an inner casing 4 (rotor) and an intermediate casing 5 which is concentric to the first two casings and divides the gap between them into an inner primary gas channel 6 for the compression of air and a secondary channel 7 in which the engine bypass air flows. Thus, each of the gas channels 6,7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

The engine 1 will be further described below, supported by FIG. 2. A first or high pressure shaft 15 joins the high pressure turbine 13 to the high pressure compressor 11 to substantially form a first or high pressure rotor. A second or low pressure shaft 17 joins the low pressure turbine 14 to the low pressure compressor 10 to substantially form a second or low pressure rotor. The high pressure compressor 11, combustor 12 and high pressure turbine 13 are collectively referred to as a core engine 19. The second or low pressure shaft 17 is at least in part rotatably disposed co-axially with and radially inwardly of the first or high pressure rotor.

The engine has a frame structure 20 including a forward or fan frame 21 connected by the intermediate casing 5 to an aft engine frame or turbine frame 22. The engine is mounted to an aircraft such as by a pylon (not illustrated), which extends downwardly from an aircraft wing. The turbine frame 22 comprises an outer structural ring 23, which may be a casing, disposed co-axially about the centerline 2. The turbine frame 22 comprises an inner structural ring 24 disposed co-axially with and radially spaced inwardly of the first structural ring 23. The turbine frame 22 further comprises a plurality of circumferentially spaced apart struts 25 extending in the engine radial direction between the first and second structural rings 23,24 and fixedly joined thereto.

The engine is mounted to the aircraft at a forwardly located fan frame forward mount on the fan frame 21 and at a rearwardly located turbine frame aft mount 27 on the turbine frame 22. In the exemplary embodiment, the aft mount comprises a U-shaped clevis. The clevis is designed to be connected by a set of pins to a set of links. Of course, also other types of mounting means than a clevis can be utilized to mount the engine 1 to the aircraft. The turbine frame aft mount 27 is fixedly joined to the turbine frame 22 radially outside of said struts 25.

The gas turbine engine 1 comprises a first bearing 28 rotatably supporting the first shaft 15 and a second bearing 29 rotatably supporting the second shaft 17 at an aft region of the engine 1. Said second bearing 29 is located axially aft of the first bearing 28 and at a larger radial distance from the engine longitudinal central axis 2 relative to the first bearing 28.

A bearing support structure 30 is arranged radially between said bearings 28,29 and said engine frame 22. The bearing support structure 30 is rigidly connected to the engine frame 22 by means of bolts 16,18. The bearing support structure 30 comprises a first annular plate-shaped part 31 with means 32 for supporting said first bearing 28 and a second annular plate-shaped part 33 with means 34 for supporting said second bearing 29. Said first and second plate-shaped parts 31,33 are joined together forming a one-piece unit in the gas turbine engine 1. Said bearings 28,29 are formed by roller bearings. Said bearing support means 32,34 are each comprises a bearing race.

Said bearing support means 32,34 may be formed by a plurality of interconnected elements. The element which is connected to the plate-shaped part 31 and 33, respectively may be formed by a casted or forged piece.

The bearing support structure 30 comprises an annular central member 35 and the first and second plate-shaped parts 31,33 are fixedly joined to the annular central member 35. The annular central member 35 is preferably produced by forging. As an alternative, it is produced by casting. The annular central member 35 has the function to stabilize the bearing support structure and may be of an easily manufactured design. The first annular plate-shaped part 31 and the second annular plate-shaped part 32 extend in different directions from the annular central member 35 towards the two bearings 28,29. Each of the first annular plate-shaped part 31 and the second annular plate-shaped part 33 has a frusto-conical shape.

The bearing support structure 30 further comprises a third annular plate-shaped part 36 with means 37 for connection to the engine frame 22. The third plate-shaped part 36 is fixedly joined to the annular central member 35. Said means 37 for connection to the engine frame is formed by a ring and in this case directed radially inwards from an end portion of the third plate-shaped part 36.

The bearing support structure 30 further comprises a fourth annular plate-shaped part 38 with means 39 for connection to the engine frame 22. Also the fourth plate-shaped part 38 is fixedly joined to the annular central member 35. Said means 39 for connection to the engine frame is in this case formed by a ring, which is connected to an end portion of the fourth plate-shaped part 36 radially outwards of the same.

Each of the four conical plate-shaped parts 31,33,36,38 is preferably fixedly joined to the central member by means of welding before the bearing support structure is installed in the engine. Further, said connection means 37,39 preferably forms part of a bolt connection. Further, said means 37,39 for connection to the engine frame may be formed by a casted or forged piece, which is machined for the desired shape and/or function. Each of the third annular plate-shaped part 36 and the fourth annular plate-shaped part 38 has a frusto-conical shape.

The first plate-shaped part 31 and the fourth plate-shaped part 38 extend from opposite sides of the annular central member 35 and have substantially the same inclination. The second plate-shaped part 33 and the third plate-shaped part 36 extend from opposite sides of the annular central member 35 and have substantially the same inclination. Such a construction minimizes local torsional moment concentrations. Thus, the bearing support structure 30 has the shape of an X in cross section, with each of the plate-shaped parts 31,33,36,38 forming one leg of the X.

The annular central member 35 comprises an opening 40 facing between said first and second annular plate-shaped parts 31,33 and forming a lead-through to an opposite side of the annular central member facing between the third and fourth plate-shaped parts 36,38. The opening creates conditions for arranging connections for hoses or pipes in order to have for example air and/or oil transport to and from the bearings 28,29.

The invention is not in any way limited to the above described embodiments, instead a number of alternatives and modifications are possible without departing from the scope of the following claims.

Figure 2:
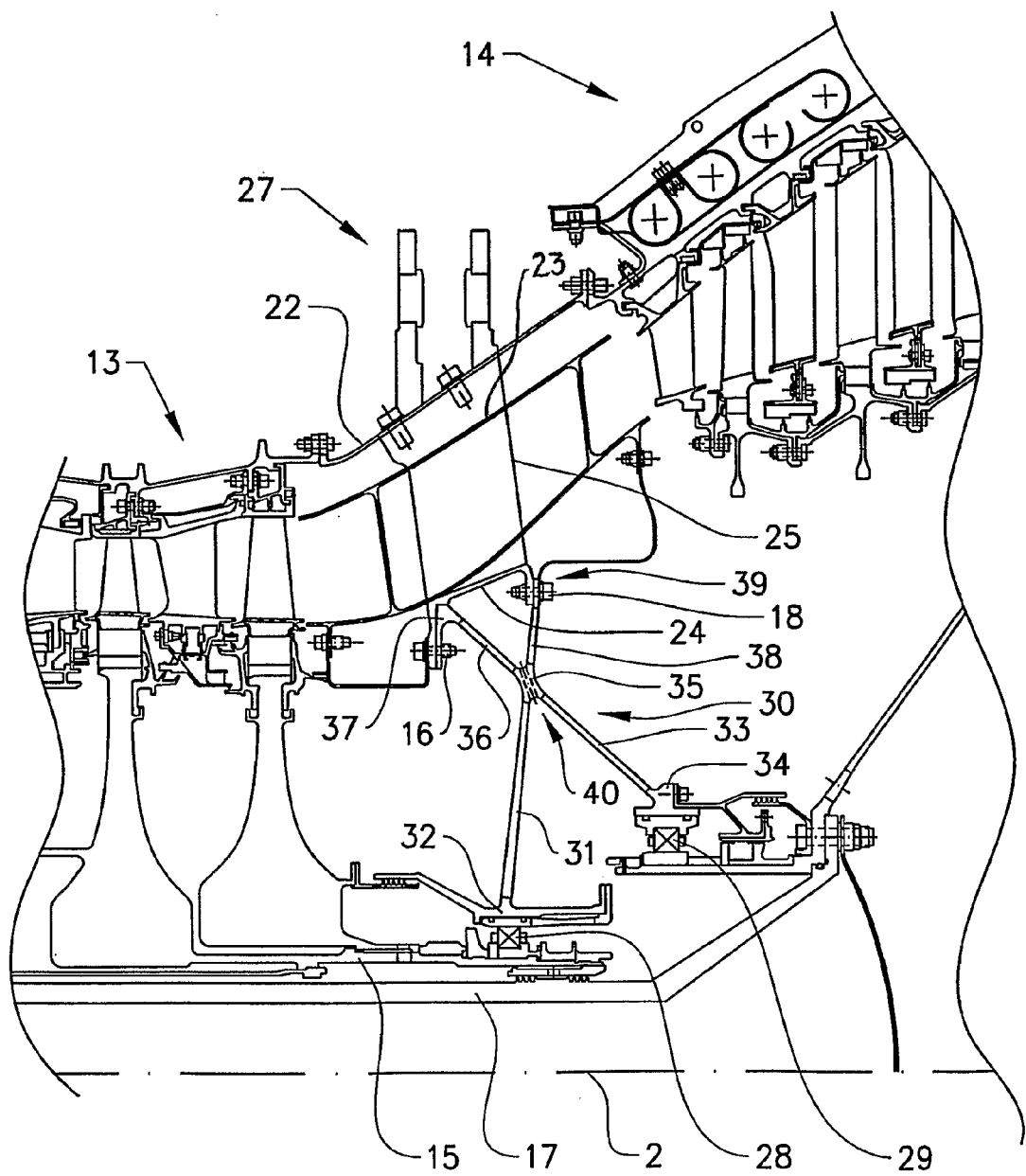
FIG. 2 is an enlarged view of a first embodiment of a bearing support structure connected to an aft engine frame between a high pressure turbine and a low pressure turbine in the engine of FIG. 1.
Figure 3:
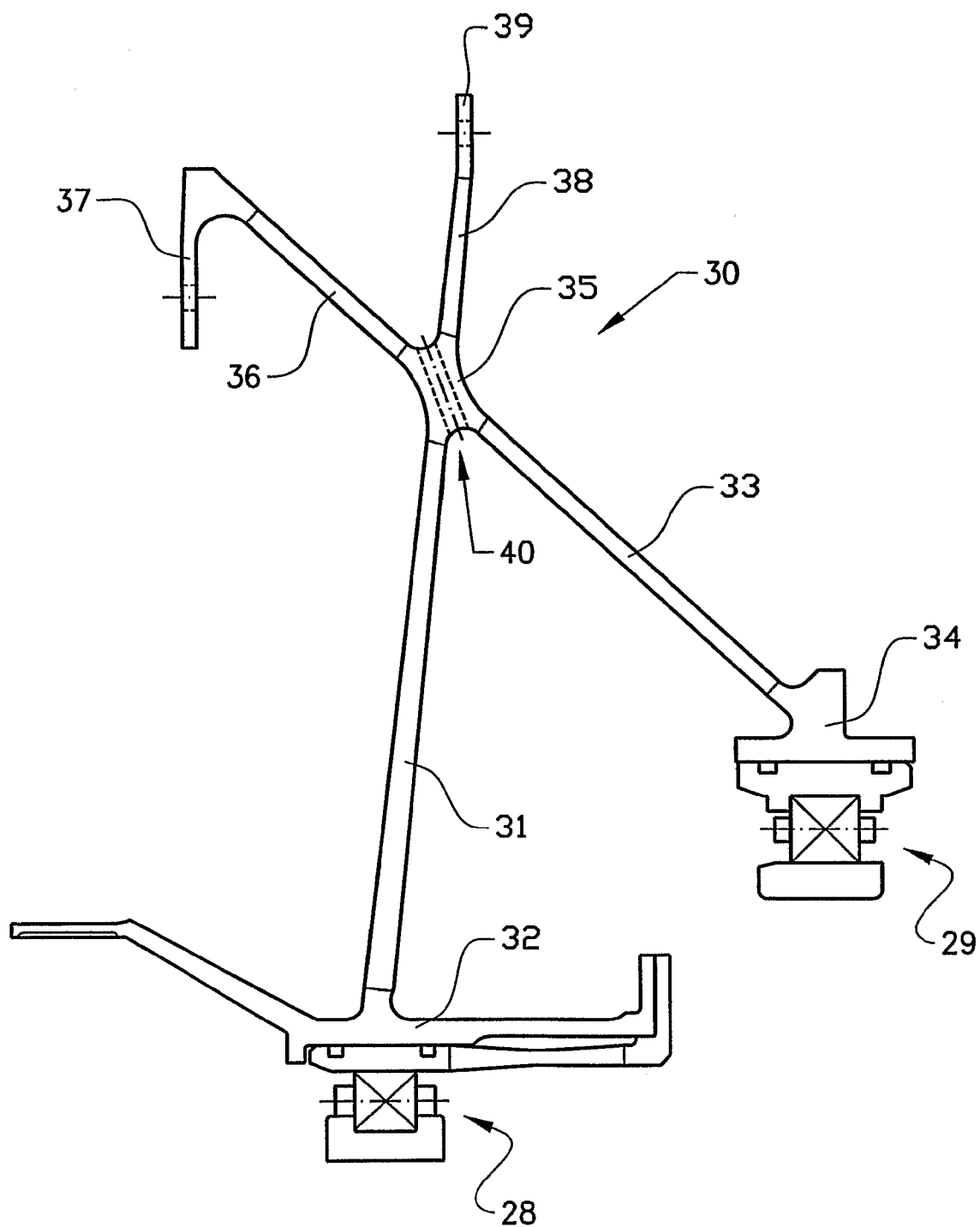
FIG. 3 is an enlarged side view of the bearing support structure of FIG. 2.

The shape of the bearing support structure 30 may be different from the X-shaped structure shown in FIGS. 2 and 3. For example, it may only comprise two plate-shaped parts, each extending from the annular central member radially inwards in order to support a bearing. The annular central member may in this case be fastened directly to the engine frame. The bearing support structure in this case has a general V-shape in cross section. Further, as an alternative, the bearing support structure may in addition to said two radially inwardly extending plate-shaped parts comprise a third plate-shaped part extending radially outwards from the annular central member. The third plate-shaped part would in this case be fastened to the engine frame. The bearing support structure according to this alternative has a general Y-shape in cross section. A number of alternatives of these shapes are obvious for a man skilled in the art once presented with the inventive concept.

Said means 32,34 for supporting the two bearings 28,29 may take any form; the embodiment shown in FIGS. 2 and 3 should only be regarded as a non-limiting example. Further, said means 37,39 for connection of the bearing support structure to the engine frame 22 may take any form; the embodiment shown in FIGS. 2 and 3 should only be regarded as a non-limiting example.

The invention claimed is:

1. A bearing support structure for installation in a gas turbine engine between radially inner first and second hearings adapted to rotatably support a first and a second rotor, respectively, and radially outer engine frame, the support structure comprising a first annular plate-shaped part and means for supporting the first bearing at one end thereof and a second annular plate-shaped part and means for supporting the second bearing at one end thereof, wherein the first and second plate-shaped arts are joined together forming a on-peice unit for installation in the gas turbine engine, and the structure comprises a third annular plate-shaped part with means for connection to the engine frame and an annular central member, the first, second, and third plate-shaped parts being fixedly joined to the annular central member.

2. A hearing support structure according to claim 1, wherein the first annular plate-shaped part and the second annular plate-shaped part extend in different directions from a joining point.

3. A bearing support structure according to claim 1, wherein the structure comprises an annular central member and the first and second plate-shaped parts are fixedly joined to the annular central member.

4. A bearing support structure according to claim 3, wherein the annular central member comprises an opening facing between the first and second annular plate-shaped parts and forming a lead-through to an opposite side of the annular central member.

5. A bearing support structure according to claim 1, wherein the second plate-shaped part and the third plate-shaped part extend with substantially a same inclination in relation to a beating support structure central axis.

6. A bearing support structure according to claim 5, wherein the structure comprises a fourth annular plate-shaped part with means for connection to the engine frame.

7. A bearing support structure according to claim 6, wherein the first and second plate-shaped parts are fixedly joined to the annular central member, and wherein the fourth plate-shaped part is fixedly joined to the annular central member.

8. A bearing support structure according to claim 6, wherein the second plate-shaped pan and the third plate-shaped part extend with substantially a same inclination in relation to a bearing support structure central axis.

9. A bearing support structure according to claim 6, wherein the third annular plate-shaped part and the fourth annular plate-shaped part extend in different directions.

10. A bearing support structure according to claim 1, wherein the bearing support structure has the general shape of an X in a cross section and the first and second plate-shaped parts each form one leg in the X.

11. A bearing support structure according to claim 1, wherein at least one of the annular plate-shaped pans has a conical shape.

12. A gas turbine engine comprising a first and a second rotor, a first and a second bearing rotatably supporting the first and second rotor, respectively, an engine frame and a bearing support structure arranged radially, between the bearings and the engine frame, the bearing support structure comprising a first annular elate-shaped part and means for supporting the first bearing at one end thereof and a second annular plate-shaped part and means for supporting the second bearing at one end thereof, wherein the first and second plate-shaped parts are joined together forming a one piece unit in the gas turbine engine, wherein the bearing support structure comprises a third annular plate-shaped part with means for connection to the engine frame and an annular central member, the first, second and third plate-shaped parts are being fixedly joined to the annular central member.

13. A gas turbine engine according to claim 12, wherein the first annular plate-shaped part and the second annular plate-shaped part extend in different directions from a joining region.

14. A gas turbine engine according to claim 12, wherein the annular central member comprises an opening facing between first and second annular plate shaped parts and forming a lead-through to an opposite side of the annular central member.

15. A gas turbine engine according to claim 12, wherein the structure comprises a fourth annular plate-shaped part with means for connection to the engine frame.

16. A gas turbine engine according to claim 15, wherein the fourth plate-shaped part is fixedly joined to the annular central member.

17. A gas turbine engine according to claim 15, wherein the third annular plate-shaped part and the fourth annular plate-shaped part extend in different directions.

18. A gas turbine engine according to claim 17, wherein at least one of the annular plate-shaped parts has a conical shape.

19. A gas turbine engine according to claim 12, wherein the bearing support structure is connected to an engine aft frame located between a high pressure turbine and a low pressure turbine.

20. A gas turbine engine according to claim 19, wherein a rearwardly located turbine frame aft mount is rigidly fastened to the engine frame.

* * * * *